United States Patent
Meadowcroft et al.

(10) Patent No.: US 8,280,203 B2
(45) Date of Patent: Oct. 2, 2012

(54) PARALLEL OPTICAL COMMUNICATIONS DEVICE HAVING WELDABLE INSERTS

(75) Inventors: David J. K. Meadowcroft, San Jose, CA (US); Hui Xu, Santa Clara, CA (US); Ye Chen, San Jose, CA (US); Ron Kaneshiro, Los Altos, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 444 days.

(21) Appl. No.: 12/498,871

(22) Filed: Jul. 7, 2009

(65) Prior Publication Data

US 2011/0008005 A1  Jan. 13, 2011

(51) Int. Cl.
    *G02B 6/12* (2006.01)
(52) U.S. Cl. ............... 385/14; 385/88; 385/92; 385/94; 398/135; 398/139
(58) Field of Classification Search .................. None
    See application file for complete search history.

(56) References Cited

U.S. PATENT DOCUMENTS

| 7,176,436 | B2 | 2/2007 | Zheng et al. |
| 7,223,629 | B2 | 5/2007 | Zheng et al. |
| 7,255,496 | B2 | 8/2007 | Narayan et al. |
| 2003/0161588 | A1* | 8/2003 | Wolf et al. ............ 385/88 |
| 2003/0161603 | A1 | 8/2003 | Nadeau et al. |
| 2004/0264865 | A1* | 12/2004 | Joo et al. ............ 385/48 |
| 2006/0088255 | A1 | 4/2006 | Wu et al. |

* cited by examiner

*Primary Examiner* — Uyen Chau N Le
*Assistant Examiner* — Chad Smith

(57) ABSTRACT

A parallel optical communications device is provided that has an OSA that includes at least one heat dissipation block having a slot formed in a lower surface thereof that contains a weldable insert. Likewise, an upper surface of the mounting device of the ESA has at least one slot formed therein that contains a weldable insert. After the OSA is placed in contact with the ESA and optically aligned with the ESA, the OSA is secured to the upper surface of the mounting device of the ESA by welding together the respective weldable inserts contained in the respective slots in the OSA and in the mounting device of the ESA. The welding process results in an extremely strong welded joint between the OSA and the ESA that prevents relative movement between the OSA and the ESA if external forces that are exerted on the OSA and/or on the ESA.

20 Claims, 8 Drawing Sheets

PARALLEL OPTICAL COMMUNICATIONS DEVICE HAVING WELDABLE INSERTS

TECHNICAL FIELD OF THE INVENTION

The invention relates to parallel optical communications devices such as parallel optical transmitters, receivers, and transceivers. More particularly, the invention relates to a parallel optical communications device having weldable inserts that enable parts of the device to be secured to each other in a way that ensures that there will be no relative movement between the parts, while still allowing the device to have good heat dissipation characteristics.

BACKGROUND OF THE INVENTION

A variety of parallel optical communications devices exist for simultaneously transmitting and/or receiving multiple optical data signals over multiple respective optical data channels. Parallel optical transmitters have multiple optical transmit channels for transmitting multiple respective optical data signals simultaneously over multiple respective optical waveguides (e.g., optical fibers). Parallel optical receivers have multiple optical receive channels for receiving multiple respective optical data signals simultaneously over multiple respective optical waveguides (e.g., optical fibers). Parallel optical transceivers have multiple optical transmit channels and multiple optical receive channels for transmitting and receiving multiple respective optical transmit and receive data signals simultaneously over multiple respective transmit and receive optical waveguides (e.g., optical fibers).

For each of these different types of parallel optical communications devices, a variety of different designs and configurations exist. A typical layout for a parallel optical communications device includes a first mounting device, such as a printed circuit board (PCB), a flex circuit, or a leadframe, which is used to mount a plurality of active optical devices (e.g., laser diodes and/or photodiodes) and one or more integrated circuits (ICs) (e.g., a laser diode driver IC, a receiver IC, a controller IC). The combination of these electrical components and the first mounting device on which they are mounted is typically referred to as the electrical subassembly (ESA). A second circuit board, such as a PCB, a ball grid array (BGA), or the like, that is external to the parallel optical communications device, is used for mounting one or more other ICs and other electrical components. The second circuit board and the first mounting device are electrically connected to each other to provide electrical connections between the electrical components of the ESA and the electrical components mounted on the second circuit board.

Similar configurations are used for parallel optical receivers, except that the ESA has a plurality of photodiodes instead of laser diodes and a receiver IC instead of a laser diode driver IC. An ESA of a parallel optical transceiver typically has laser diodes, photodiodes, a laser driver diode IC, and a receiver IC, although one or more of these devices may be integrated into the same IC to reduce part count and to provide other benefits.

A typical parallel optical communications device also includes an optical subassembly (OSA), which holds optical elements for coupling light between the laser diodes and/or photodiodes of the ESA and the ends of respective optical fibers that are held within a connector that mechanically couples with the OSA. The OSA is secured to the ESA. There are sometimes mating features on the OSA and on the ESA that allow the OSA to be coupled to the ESA in a way that limits movement of the OSA relative to the mounting device to provides some degree of coarse alignment between the optical elements of the OSA and the laser diodes and/or photodiodes of the ESA. Prior to coupling the OSA to the ESA, an adhesive material, such as epoxy, for example, is placed at one or more locations on one or more surfaces of the OSA and/or of the ESA. After the OSA has been coupled to the mounting device, and prior to the adhesive material hardening, an alignment process is typically used during which relative movement between the OSA and the ESA is produced until a determination is made that the optical elements of the OSA are precisely aligned with the laser diodes and/or photodiodes of the ESA. The OSA and the ESA are then tightly held in the aligned position until the adhesive material has been cured and otherwise hardens.

There are several challenges associated with coupling the OSA to the ESA, precisely optically aligning the OSA with the laser diodes and/or photodiodes of the ESA, and securing the OSA to the ESA in the precisely aligned position. In order to manufacture the parallel optical communications modules with high volume, the OSA must be coupled, precisely aligned, and secured to the OSA very quickly, e.g., in less than one minute. In addition, after the OSA has been secured to the ESA, very little or no movement of the OSA and ESA relative to each other should occur over the life of the parallel optical communications device, or else the precise optical alignment may be lost. Precise optical alignment is critical to having good signal integrity, and thus good overall performance. Often times, a customer attaches a heat sink device to the parallel optical communications device, which causes forces to be exerted on the OSA and/or on the ESA. If the bond that is formed by the adhesive material is not sufficiently strong, the exertion of such forces over months or years can result in very slow movement of the OSA and ESA relative to each other, sometimes referred to as creeping. Of course, such movement can result in the precise alignment needed being lost, resulting in a degradation in performance.

In addition to the issues associated with aligning the OSA with the ESA and securing them together, heat dissipation is a major consideration in parallel optical communications devices. In the aforementioned parallel optical communications devices, some portion or portions of the mounting device of the ESA has one or more heat sink devices thereon that dissipate heat generated by the electrical components of the ESA. Often times, the customer provides its own heat sink device, which the customer secures to the mounting device of the ESA. The heat sink device is typically secured to the mounting device of the ESA by a thermally conductive epoxy material. One of the problems associated with securing the heat sink device to the ESA is that the customer typically exerts a relatively large force on the heat sink device during this process, which, in turn, is exerted on the ESA. Components of this force may also be exerted on the OSA. Such forces can result in movement of the OSA and the ESA relative to each other, which can result in the precise alignment between the OSA and the ESA being lost.

The aforementioned heat sink devices have various shapes or configurations, but have the same general purpose of receiving heat generated by the ICs and active optical devices of the ESA and absorbing and/or spreading out the heat such that the heat is moved away from the ICs and active optical devices. Heat generated by the ICs can detrimentally affect the performance of the parallel optical communications device. For example, in parallel optical transmitters and transceivers, the laser diode driver ICs generate very large amounts of heat in producing the high speed signals that drive the laser diodes. If adequate measures to dissipate this heat are not taken, the heat can detrimentally affect the performance of the laser diode ICs, which are typically placed in relatively close proximity to the laser diode driver IC. Heat dissipation considerations are even more important in parallel optical communications device due to the large number of channels and associated electrical circuitry.

In addition, there is an ever-increasing need to decrease the size of parallel optical communications devices and to increase the number of channels in parallel optical communications devices. In order to meet these needs, the layout of a parallel optical communications device should be efficient in terms of space utilization, highly effective at dissipating heat, and protective of signal integrity. As the number of channels and the associated electrical components increases, the amount of heat that must be dissipated also increases, which emphasizes the need for a highly effective heat dissipation configuration. Also, as the dimensions of the parallel optical communications device decrease, the space between the electrical components decreases. This reduced space between components also emphasizes the need for a highly effective heat dissipation configuration in order to prevent heat generated by one component from detrimentally affecting another.

In addition to the need for highly effective heat dissipation configurations in parallel optical communications devices, the OSA should be secured to the ESA in a way that ensures that there will be no movement of the OSA and ESA relative to each other. In general, parallel optical communications devices are non-hermetically, or semi-hermetically, sealed devices. As indicated above, typically, an adhesive material such as epoxy is used to secure the OSA to the ESA while the OSA and the ESA are held in tight alignment. This adhesive bond tends to be structurally weak, which can result in movement of the OSA and the ESA relative to each other. Likewise, as indicated above, an adhesive material such as a thermally conductive epoxy is often used to secure the heat sink device to the mounting device of the ESA. This adhesive bond is also relatively structurally weak, which can result in movement of the heat sink device and the ESA relative to each other. As indicate above, such movement can result in forces being exerted on the OSA, resulting in movement of the OSA and the ESA relative to each other. Such movement can, as indicated above, result in the precise optical alignment between the OSA and the ESA being lost, which can result in a degradation in signal quality.

Accordingly, a need exists for a parallel optical communications device that is configured with an extremely strong bond between the OSA and the mounting device of the ESA to prevent any movement between the OSA and the ESA, and which does not impede the heat dissipation qualities of the parallel optical communications device. A need also exists for a method for quickly aligning and securing the OSA to the mounting device of the ESA in a way that creates an extremely strong bond at the interface between the OSA and the ESA mounting surface and that enables very precise optical alignment to be achieved between the OSA and the ESA.

SUMMARY OF THE INVENTION

The invention is directed to a parallel optical communications device and to a method. The parallel optical communications device comprises a substrate, an electrical subassembly (ESA) mounted on the substrate, and an optical subassembly (OSA) mechanically coupled to the ESA. The ESA includes a mounting device having at least an upper surface and a lower surface. The upper surface of the mounting device has at least one IC and a plurality of active optical devices mounted thereon. The IC is electrically coupled to the active optical devices and to one or more electrical conductors of the substrate. The mounting device has at least one slot formed in the upper surface thereof and at least one weldable ESA insert contained in the slot. The OSA includes at least one heat dissipation block secured thereto comprising a material having a high thermal conductivity. The heat dissipation block has at least one slot formed in a lower surface thereof and at least one weldable OSA insert contained in the slot. The lower surface of the heat dissipation block is in at least partial contact with the upper surface of the mounting device such that the weldable OSA and ESA inserts are at least partially in contact with one another. The weldable ESA insert and the weldable OSA insert are welded together to form at least one welded joint between the OSA and the ESA. The welded joint is structurally very strong to prevent relative movement from occurring between the OSA and the ESA, even if external forces are exerted on the ESA and/or the OSA.

In accordance with another embodiment of the parallel optical communications device, the mounting device has at least two slots formed in the upper surface thereof at opposite ends of the mounting device, with each slot having at least one weldable ESA insert contained therein. The OSA includes at least two heat dissipation blocks secured to opposite ends thereof comprising a material having a high thermal conductivity. The heat dissipation blocks have at least one slot formed in the lower surfaces thereof and respective weldable OSA inserts contained in the respective slots. The lower surfaces of the heat dissipation blocks are in at least partial contact with the upper surface of the mounting device such that the respective weldable OSA inserts and the respective ESA weldable inserts are at least partially in contact with one another. The respective weldable ESA inserts and the respective weldable OSA inserts are welded together to form at least two welded joints between the OSA and the ESA. The welded joints are structurally very strong to prevent relative movement from occurring between the OSA and the ESA, even if external forces are exerted on the ESA and/or on the OSA.

The method for securing an ESA of a parallel optical communications device to an OSA of the parallel optical communications device comprises mounting a mounting device of an ESA on a substrate, mechanically coupling an OSA to the ESA, optically aligning the OSA to the ESA, and welding a weldable ESA insert contained in a slot formed in the upper surface of the mounting device together with a weldable OSA insert contained in a slot formed in the upper surface of a heat dissipation block of the OSA to form a welded joint between the OSA and the ESA. The welded joint is structurally very strong to prevent relative movement from occurring between the OSA and the ESA, even if external forces are exerted on the ESA and/or on the OSA.

In accordance with another embodiment, the method for securing an ESA of a parallel optical communications device to an OSA of the parallel optical communications device comprises mounting a mounting device of an ESA on a substrate, mechanically coupling an OSA to the ESA, optically aligning the OSA to the ESA, and welding the weldable ESA insert and the weldable OSA insert together to form at least one welded joint between the OSA and the ESA. In accordance with this embodiment, at least two slots are formed in the upper surface of the mounting device at opposite ends thereof, with each slot having a weldable ESA insert contained therein. The OSA includes at least two heat dissipation blocks secured to opposite ends thereof comprising a material having a high thermal conductivity. The heat dissipation blocks each have at least one slot formed in the lower surface thereof and respective weldable OSA inserts that are contained in the respective slots. The lower surfaces of the heat dissipation blocks are in at least partial contact with the upper surface of the mounting device such that the respective weldable OSA inserts and the respective weldable ESA inserts are at least partially in contact with one another. The welded joints between the OSA and the ESA are structurally very strong to prevent relative movement from occurring between the OSA and the ESA, even if external forces are exerted on the ESA and/or the OSA.

These and other features and advantages of the invention will become apparent from the following description, drawings and claims.

DETAILED DESCRIPTION OF AN ILLUSTRATIVE EMBODIMENT

In accordance with the invention, a parallel optical communications device is provided that has an OSA that includes at least one heat dissipation block having a slot formed in a lower surface thereof that contains a weldable insert. Likewise, an upper surface of the mounting device of the ESA has at least one slot formed therein that contains a weldable insert. After the OSA has been placed in contact with the ESA and optically aligned with the ESA, the OSA is secured to the upper surface of the mounting device of the ESA by welding together the weldable inserts contained in the slots in the OSA and in the slots formed in the mounting device of the ESA. The welding process results in an extremely strong welded joint being formed between the OSA and the ESA that prevents relative movement between the OSA and the ESA. In this way, any forces that are exerted on the parallel optical communications device temporarily or over its lifetime will not cause the precise optical alignment of the OSA and the ESA to be compromised. In addition, the weldable inserts are small in size compared to the dimensions of the lower surface of the heat dissipation block and the upper surface of the ESA mounting device to ensure that the inserts do not block the heat dissipation pathways from the ESA mounting device into and through the heat dissipation block.

Figure 1:
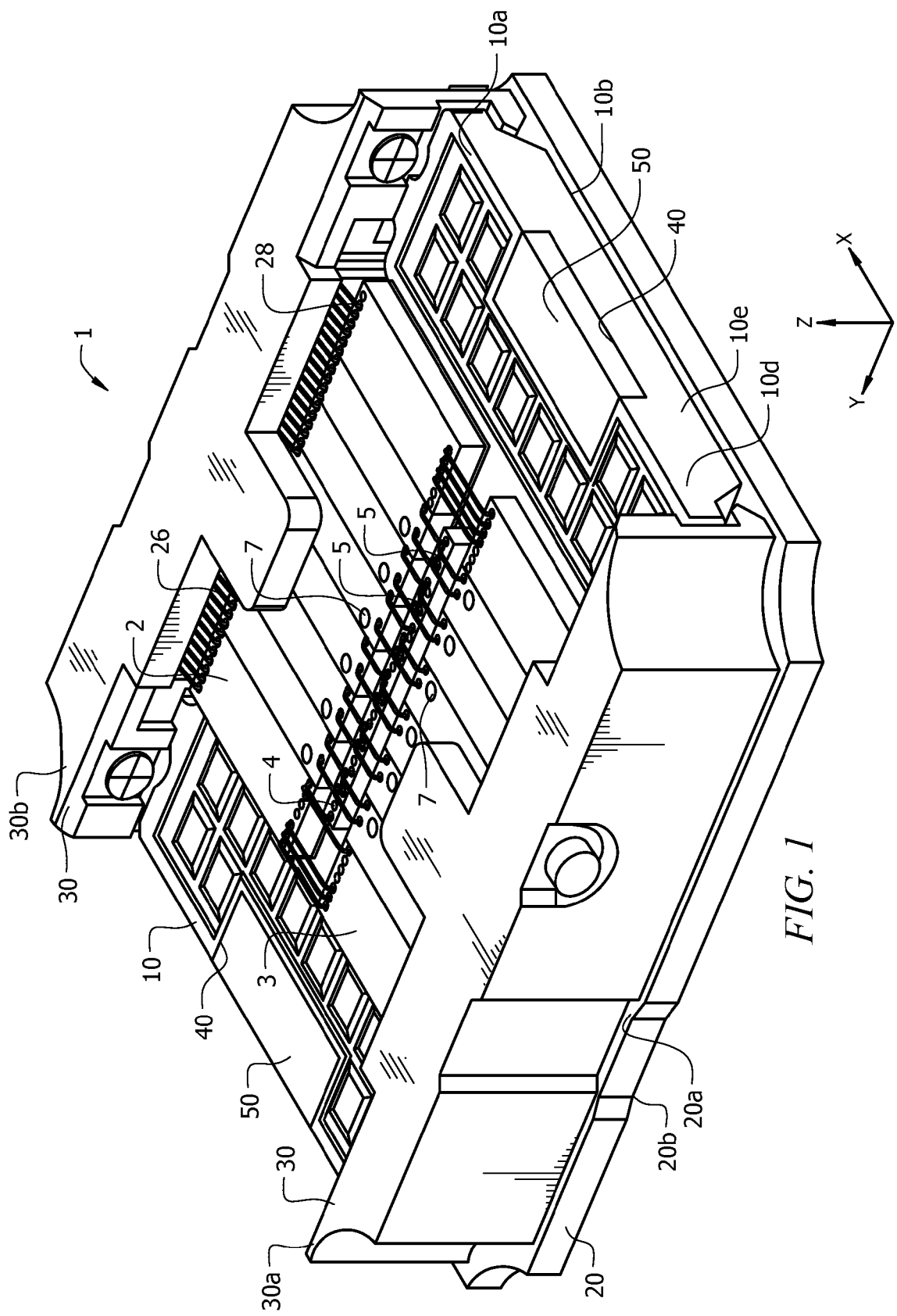
FIG. 1 illustrates a perspective view of the lower portion of a parallel optical communications device, which includes the ESA mounted on a substrate and having a bond wire protector attached thereto.

FIG. 1 illustrates a perspective view of the lower portion of a parallel optical communications device, which includes the ESA 1 mounted on a substrate 20 and having a bond wire protector 30 attached thereto. The bond wire protector 30 includes first and second bond wire protector devices 30A and 30B, as will be described below in more detail. In accordance with this embodiment, the parallel optical communications device is a parallel optical transmitter. However, it should be noted that the parallel optical communications device of the invention may instead be a parallel optical receiver or a parallel optical transceiver. In the interest of brevity, illustrative embodiments of the invention will be described with reference to a parallel optical transmitter. Those of ordinary skill in the art will understand the manner in which the principles and concepts described herein in relation to the parallel optical transmitter described herein with reference to the drawings can be applied to parallel optical receivers and parallel optical transceivers.

The ESA 1 includes a mounting device 10 and the core electrical components 2, 3 and 4 of the parallel optical transmitter. The mounting device 10 serves as a mounting core for mounting at least the core electrical components of the parallel optical transmitter. In accordance with this embodiment, the core electrical components of the ESA 1 include a first laser diode driver IC 2, a second laser diode driver IC 3, and a vertical cavity surface emitting laser (VCSEL) IC 4. The laser diode driver ICs 2 and 3 and the VCSEL IC 4 are mounted on an upper surface 10A of the mounting device 10. The laser diode driver ICs 2 and 3 are electrically connected to the VCSEL IC 4 by electrical conductors (not shown), such as bond wires, to enable electrical control signals and other electrical signals to be sent from the laser diode driver ICs 2 and 3 to the VCSEL IC 4. The VCSEL IC 4 has a plurality of VCSEL laser diodes 5 that produce a plurality of respective optical data signals based on the electrical control signals and respective electrical data signals provided to the VCSEL IC 4 by the laser diode driver ICs 2 and 3. The electrical control signals control the bias and modulation currents of the VCSEL laser diodes 5.

In the illustrative embodiment shown in FIG. 1, the laser diode driver ICs 2 and 3 and the VCSEL IC 4 are arranged in a balanced laser driver layout on the upper surface 10A of the mounting device 10. In the balanced laser driver layout, half of the laser diodes 5 of the VCSEL IC 4 are driven by laser diode driver IC 2 and the other half of the laser diodes 5 of the VCSEL IC 4 are driven by laser diode driver IC 3. Because each of the laser diode driver ICs 2 and 3 drives a subset of the total number of laser diodes 5, the pitch (i.e., distance) between the high-speed signal pathways within the laser diode driver ICs can be increased. Increasing the pitch between the high-speed signal pathways provides several advantages. One advantage of the increased pitch is that it reduces the potential for electrical cross-talk and inductive coupling between adjacent wire bonds that connect the output driver pads on the driver IC to the respective input pads on the laser diode IC. Reducing the potential for electrical cross-talk and inductive coupling between these wire bonds helps ensure high signal integrity.

Another advantage of the increased pitch is that the reduced potential for electrical cross-talk and inductive coupling makes it possible to mount the driver ICs 2 and 3 in closer proximity to the laser diode IC 4 than would otherwise be possible. Mounting the driver ICs 2 and 3 in closer proximity to the laser diode IC 4 allows the lengths of the wire bonds between the driver ICs 2 and 3 and the laser diode IC 4 to be reduced, which further reduces the potential for electrical cross-talk and inductive coupling between adjacent wire bonds.

While the balanced laser driver layout shown in FIG. 1 provides several advantages, it should be noted that it is not necessary to use the balanced laser driver layout shown in FIG. 1. The ICs and any other components that are mounted on the upper surface 10A of the mounting device 10 may be arranged in any desired layout. For example, the laser diode driver IC 2 could be used to drive all of the laser diodes 5 of the VCSEL IC 4, in which case the laser diode driver IC 3 could be eliminated. Also, the invention is not limited with respect to the types of laser diodes that are used. Laser diodes other than VCSELs may be used for this purpose. The invention also is not limited with respect to the types or quantity of components that are mounted on the mounting device 10.

In the embodiment shown in FIG. 1, monitor photodiodes 7 are integrated into the laser diode driver ICs 2 and 3. These monitor photodiodes 7 monitor the optical output levels of respective ones of the laser diodes 5 and produce corresponding electrical signals that are fed back to control logic (not shown), which uses the feedback to adjust the electrical control signals that are delivered by the laser diode driver ICs 2 and 3 to the VCSEL IC 4. These control signals cause the bias and/or modulation currents of the laser diodes 5 to be adjusted such that the average optical output power levels of the laser diodes 5 are maintained at substantially constant predetermined levels. The increased pitch between the high-speed signal paths provided by the balanced driver layout shown in FIG. 1 enables the monitor photodiodes 7 to be integrated into the laser diode driver ICs 2 and 3. Integrating the monitor photodiodes 7 into the laser diode driver ICs 2 and 3 eliminates the need to provide a separate monitor photodiode IC in the transmitter 1 for monitoring the optical output power levels of the laser diodes 5. Eliminating the need for a separate monitor photodiode IC results in a more efficient utilization of space in the optical transmitter 1, thereby enabling the transmitter 1 to be reduced in size relative to the aforementioned known parallel optical transmitters. In addition, eliminating the need for a separate monitor photodiode IC also results in fewer wire bonds and pin connections, which reduces circuit complexity, power consumption, electrical cross-talk, and inductive coupling. However, the monitor photodiodes 7 are optional and are not required by the parallel optical communications device of the invention.

The mounting device 10 has a lower surface 10B that is attached to an upper surface 20A of the substrate 20 with an adhesive material, such as an epoxy, an adhesive tape or solder, for example. The substrate 20 is a circuit board of some type, such as a PCB, for example. The substrate 20 has electrical conductors (not shown) and electrical vias (not shown) extending through it and electrical contacts (not shown) on its upper surface 20A. The electrical contacts (not shown) on the upper surface 20A of the substrate 20 are electrically coupled via electrically conductive bond wires 26 to electrical contact pads 28 on the laser diode driver ICs 2 and 3. The lower surface 20B of the substrate 20 has an array of electrically conductive contact pads (not shown) thereon that electrically couple to an array (not shown) of electrically conductive contact pads located on a motherboard (not shown). The motherboard (not shown) typically has a controller IC (not shown) mounted on it that communicates with the laser diode driver ICs 2 and 3 of the ESA 1.

As will be described below in more detail with reference to FIG. 4, in accordance with this illustrative embodiment, the mounting device 10 has tabs (10C in FIG. 4) that protrude outwardly near the corners of the mounting device 10. The tabs are shaped and sized to mate with complementary indentations (not shown) formed in the first and second bond wire protector devices 30A and 30B of the bond wire protector 30. This mating configuration enables the bond wire protector devices 30A and 30B to be passively aligned with and mechanically coupled to the mounting device 10. When the bond wire protector devices 30A and 30B are in engagement with the mounting device 10, a gap exists between the bond wire protector devices 30A and 30B and the side edges of the mounting device 10 within which the bond wires 26 extend between the contacts on the substrate 20 and the contact pads 28 on the laser diode driver ICs 2 and 3. This gap ensures that the bond wire protector devices 30A and 30B do not come into contact with the bond wires 26 and damage them. The bond wire protector devices 30A and 30B protect the bond wires 26 from external forces that can potentially damage the bond wires 26, such as mechanical handling forces that occur during the manufacturing and assembling of the parallel optical transmitter. It should be noted, however, that the bond wire protector 30 is optional. Other methods and mechanisms may be used to protect the bond wires 26. For example, a method known as glob topping may be used to protect the bond wires 26.

In accordance with the illustrative embodiment depicted in FIG. 1, the mounting device 10 has an upper portion 10D that includes the upper surface 10A of the device 10, and a lower portion 10E that includes the lower surface 10B of the mounting device 10. With reference to the X, Y, Z Cartesian coordinate reference shown on the drawing page that contains FIG. 1, the length of the upper portion 10D in the X direction is greater than the length of the lower portion 10E in the X direction. The mounting device 10 is typically made of a material that has a high thermal conductivity, such as copper plated with nickel or gold, for example, to enable the device 10 to function effectively as a heat dissipation structure. Heat generated by the ICs 2, 3 and 4 passes down into the mounting device 10 and is spread into the mounting device 10. Making the upper portion 10D of the mounting device 10 large in the X direction increases the amount of surface area on the upper surface 10A that is available for sinking heat.

Because the material that is used to make the mounting device 10 is also electrically conductive, if the mounting device 10 is too close to the signal pathways (not shown) in the substrate 20, the mounting device 10 can couple capacitance into the substrate 20 that increases the capacitance of the signal pathways in the substrate 20. This increased coupling capacitance can degrade signal quality. This is especially true for the high speed signal pathways (not shown), such as those that carry the electrical data signals that are used to modulate the laser diodes 5 of the VCSEL IC 4. In accordance with this illustrative embodiment, the lower portion 10E of the mounting device 10 is made smaller than the upper portion 10D in the X direction to ensure that the lower surface 10B has a relatively small surface area compared to the upper surface 10A, thereby reducing the coupling capacitance contributed by the mounting device 10 to the substrate 20.

In order to further reduce the effect of coupling capacitance, the high speed signal pathways (not shown) in the substrate 20 may be routed such that they are never contained in the portion of the upper surface 20A of the substrate 20 that is directly below the lower portion 10E of the mounting device 10. To accomplish this, the high speed signal pathways may be either routed around this region where the lower surface 10B of the mounting device 10 attaches to the upper surface 20A of the substrate 20, or routed in lower layers of the substrate 20 that are farther away from the lower surface 10B of the mounting device 10 in this region.

While the shape of the mounting device 10 described above provides the advantages described above, it is not necessary for the mounting device 10 to have this type of configuration. For example, the mounting device 10 could have a planar configuration with the upper and lower surfaces 10A and 10B having the same lengths in the X direction. Alternatively, the mounting device may have a tapered configuration, as will be described below in more detail with reference to FIG. 4.

The upper portion 10D of the mounting device 10 has slots 40 formed therein at opposing ends of the mounting device 10. Each of the slots 40 contains a weldable insert 50. The weldable inserts 50 are used to weld the ESA 1 to the OSA (not shown), as will be described below in detail with reference to FIGS. 2A and 2B. The weldable inserts 50 are made of a material such as, for example, stainless steel SUS 316 or 304, although the invention is not limited to using any particular type of weldable material for the inserts 50. The inserts 50 may be secured within the slots 40 by a variety of methods, including, for example, push fitting the inserts 50 into the slots 40 such that the inserts are held within the slots 40 by a friction fit, and brazing the inserts 50 to the slots 40.

Figure 2A:
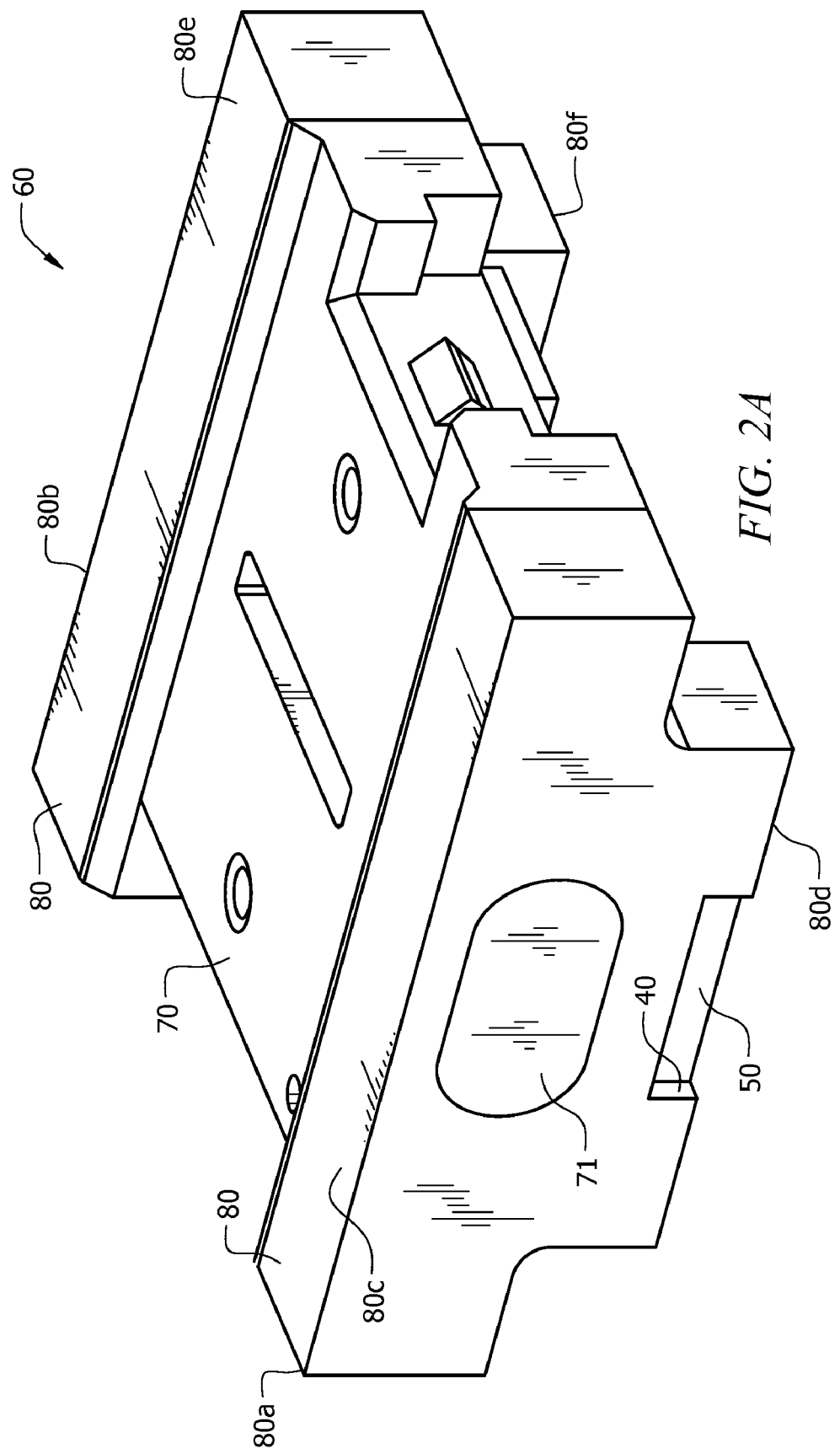
FIGS. 2A and 2B illustrate perspective top and bottom views, respectively, of the OSA of the parallel optical communications device in accordance with an embodiment, which is designed to mechanically couple to the portion of the parallel optical communications device shown in FIG. 1.
Figure 2B:
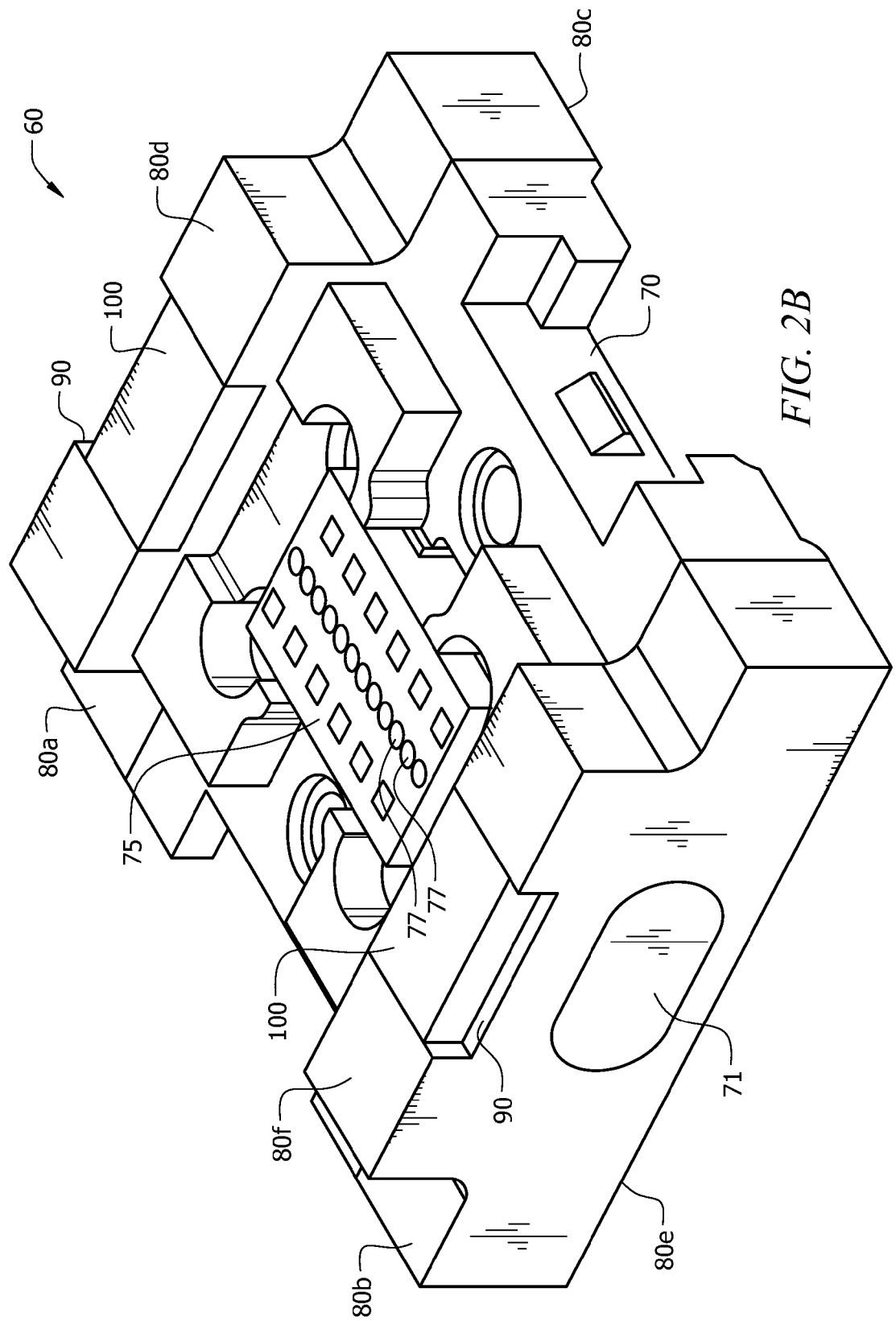

FIGS. 2A and 2B illustrate perspective top and bottom views, respectively, of the OSA 60 of the parallel optical communications device accordance with an embodiment. The OSA 60 includes a lens holder 70 and a heat dissipation system 80. In accordance with this embodiment, the heat dissipation system 80 comprises first and second heat dissipation blocks 80A and 80B, which are secured to features 71 on opposing sides of the lens holder 70. The heat block 80A has an upper surface 80C and a lower surface 80D. Likewise, the heat dissipation block 80B has an upper surface 80E and a lower surface 80F. Each of the heat dissipation blocks 80A and 80B has a slot 90 formed in the lower surface 80D and 80F, although only the slot 90 formed in the lower surface 80D of block 80A is visible in the view shown in FIG. 2A.

As can be seen in FIG. 2B, each of the slots 90 has a weldable insert 100 secured in it. The weldable inserts 100 may be secured in the slots 90 using any of the methods described above for securing the weldable inserts 50 in the slots 40 formed in the mounting device 10 (FIG. 1). The weldable inserts 100 may be made of the same material as the weldable inserts 50. The lens holder 70 holds an optic 75 that has a plurality of optical elements 77 for optically coupling light between a respective one of the laser diodes 5 and an end of a respective optical waveguide (not shown).

Figure 3:
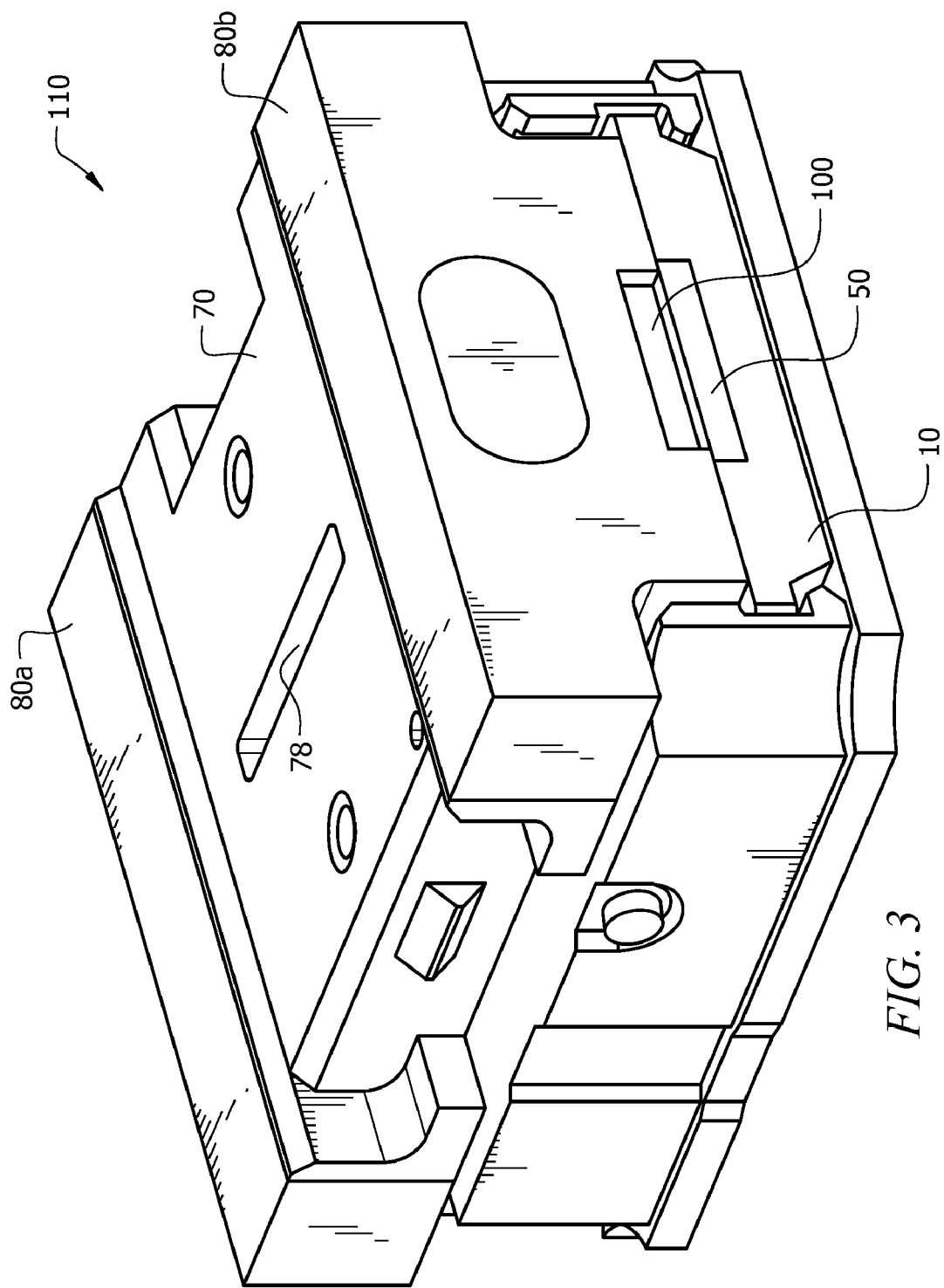
FIG. 3 illustrates a perspective top view of the parallel optical transmitter of the invention in accordance with an illustrative embodiment, which comprises the OSA shown in FIGS. 2A and 2B secured to the ESA shown in FIG. 1.

FIG. 3 illustrates a perspective top view of the parallel optical transmitter 110 of the invention in accordance with an illustrative embodiment, which shows the transmitter 110 after the OSA 60 shown in FIGS. 2A and 2B has been secured to the ESA 1 shown in FIG. 1. The manner in which the OSA 60 is secured to the ESA 1 will now be described with reference to FIGS. 1-3. In order to secure the OSA 60 to the ESA 1, the OSA 60 is placed in contact with the ESA 1 such that the weldable inserts 50 of the ESA 1 are in contact with the respective weldable inserts 100 of the OSA 60. The lens holder 70 has an aperture 78 formed therein through which light generated by the laser diodes 5 is directed by the respective optical elements 77 onto ends of respective optical waveguides (not shown) that are held within a connector (not shown) that mechanically couples with the OSA 60. After the OSA 60 has been placed in contact with the ESA 1, a vision system (not shown) captures an image of the laser diodes 5 and of the optical elements 77 and a motion system (not shown) or a person moves one or both of the OSA 60 and the ESA 1 until the respective laser diodes 5 are precisely optically aligned with the respective optical elements 77. Once optical alignment has been achieved, the OSA 60 and the ESA 1 are held tightly in the aligned position while the weldable inserts 50 and 100 are welded together at one or more locations on the inserts 50 and 100.

There are many advantages to welding the ESA 1 and the OSA 60 together. One advantage is that the weld forms a welded joint between the ESA 1 and the OSA 60 that is structurally extremely strong. The structural strength of this joint ensures that there will be no movement of the OSA 60 and of the ESA 1 relative to each other, which ensures that the precise optical alignment of the optical elements 77 with the respective laser diodes 5 will not be compromised over the entire lifetime of the parallel optical transmitter 110. As mentioned above, forces are often exerted on the transmitter after it has been manufactured, and the welded joint is strong enough to withstand these forces. For example, the customer will typically attach an external heat dissipation system (not shown) to the heat dissipation blocks 80A and 80B, and the attachment process can result in large forces (e.g., 20 lbs) being exerted on the OSA 60. The welded joint is sufficiently strong to withstand such forces, even if any of this force includes a lateral component that is maintained permanently after the external heat dissipation system has been attached.

Another advantage of welding the ESA 1 to the OSA 60 in the manner described above is that the size of the slots 40 and 90 is relatively small compared to the total surface area of the upper surface 10A of the mounting device 10 and of the lower surfaces 80D and 80F of the heat dissipation blocks 80A and 80B. The material of which the inserts 50 and 100 are made is typically a material of relatively low thermal conductivity, which is not well suited for dissipating heat. On the other hand, the material of which the mounting device 10 and the heat dissipation blocks 80A and 80B are made (e.g., copper) has a very high thermal conductivity. Therefore, it is desirable to maximize the amount of area of the upper surface 10A of the mounting device 10 that is in contact with the lower surfaces 80D and 80F of the heat dissipation blocks 80A and 80B, respectively. By embedding the inserts 50 and 100 in relatively small slots 40 and 90 formed in the surfaces 10A, 80D and 80F, most of the areas of these opposing surfaces are in contact with one another once the inserts 50 and 100 have been welded together. For example, the percentage of the respective surface areas of the lower surfaces 80D and 80F that the slots 90 consume is less than about 50%, and typically less than about 35%. For example, while the slots 40 and 90 typically have the about the same width as that of the heat dissipation blocks 80A and 80B, the length of the lower surfaces 80D and 80F of the blocks 80A and 80B may be about 5.0 millimeters (mm), whereas the length of the slots 40 and 90 may be only about one-third of that, or about 1.6 mm. These features provide the parallel optical communications device with very good heat dissipation characteristics, and thus very high thermal performance, which, as indicated above, is very important in parallel optical communications devices that communicate high speed signals over a plurality of transmit and/or receive communications channels.

Figure 4:
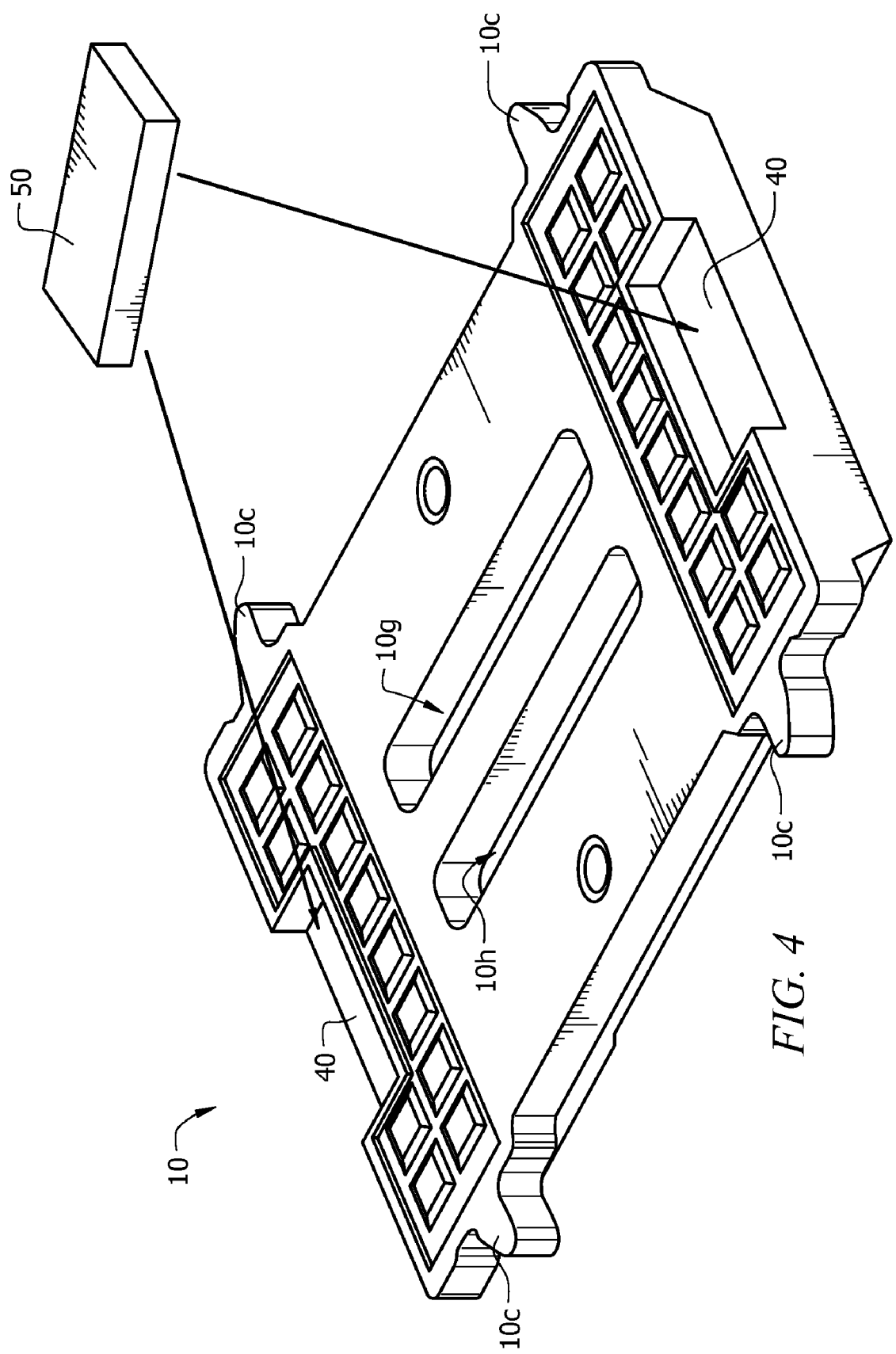
FIG. 4 illustrates a top perspective view of the mounting device shown in FIG. 3.

FIG. 4 illustrates a top perspective view of the mounting device 10 shown in FIG. 3. As mentioned above, the mounting device 10, in accordance with an embodiment, has four tabs 10C on its sides near its corners. These tabs 10C are configured to mate with complementary indentations (not shown) on the bond wire protector 30 (FIG. 1) to prevent, or at least reduce, relative movement between the mounting device 10 and the bond wire protector 30. The view shown in FIG. 4 allows the shape of the slots 40 and of the inserts 50 to be clearly seen. In accordance with an illustrative embodiment, the slots 40 and the inserts 50 are rectangular in shape, although the invention is not limited to the slots 40 and the inserts 50 having any particular shapes or sizes. In accordance with an embodiment, the mounting device 10 has slots 10G and 10H formed therein that provide air gaps between the location at which the laser diode IC 2 is mounted (in between the slots 10G and 10H) and the locations at which the laser diode driver ICs 3 and 4 are mounted. The air gaps thermally isolate the laser diode IC 2 from the driver ICs 3 and 4 to prevent heat from the laser driver ICs from detrimentally affecting the laser diodes 5 of the laser diode IC 2. The slots 10G and 10H are optional, but preferred, as they assist with the overall heat dissipation design of the parallel optical transmitter.

Figure 5:
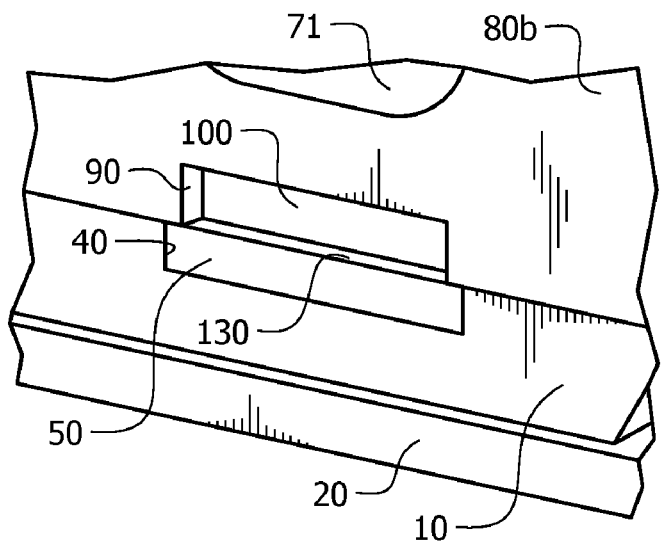
FIG. 5 illustrates an exploded view of a portion of the side of the parallel optical transmitter 110 shown in FIG. 3.

FIG. 5 illustrates an exploded view of a portion of the side of the parallel optical transmitter 110 shown in FIG. 3. In the exploded view, a portion of the substrate 20, the mounting device 10, and the side 71 of the lens holder 70 of the OSA 60 can be seen. Within the exploded view, the slots 40 and 90 and their respective inserts 50 and 100 can also be seen. In accordance with an embodiment, the slots 50 of the mounting device 10 are slightly greater in the length, L, dimension than the slots 90 of the OSA 60. The inserts 50 are slightly greater in both the length, L, and width, W dimensions. This difference between the dimensions of the slots 40 and 90 and of the inserts 50 and 100, respectively, results in steps 130 at the interfaces of the inserts 50 and 100. These steps 130 provide space for the welds to form when the inserts 50 and 100 are welded together, rather than forming on two flush faces of the opposing inserts 50 and 100. This feature improves the integrity of the welded joint. The step 130 is not necessary, as the welded joint should have sufficient strength even if the weld is formed on the flush opposing faces of the inserts 50 and 100, as will be understood by those of ordinary skill in the art in view of the description being provided herein. The step 130 is merely one way to further ensure that the resulting welded joint is extremely strong. Also, the step 130 could instead be formed by making the slots 90 slightly greater in the width dimension than the slots 40 and by making the inserts 100 slightly greater in the width and length dimensions than the inserts 50.

Figure 6:
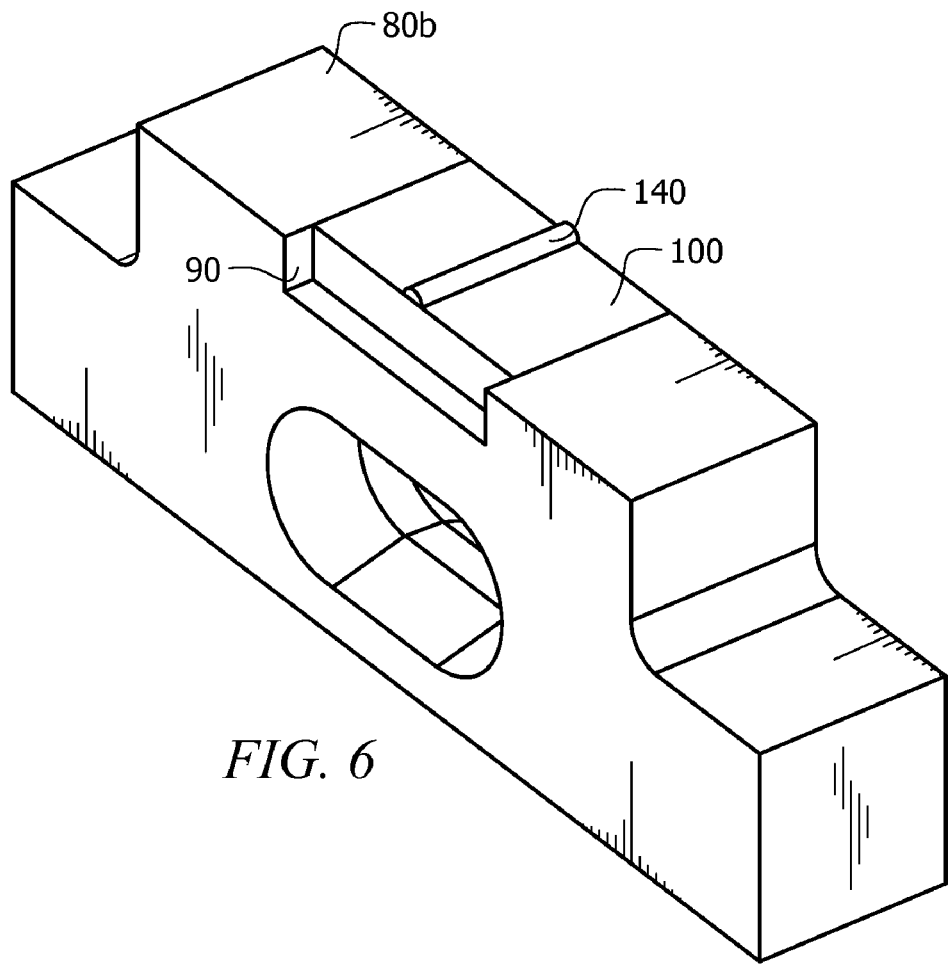
FIG. 6 illustrates a perspective bottom view of the heat dissipation block of the parallel optical transmitter 110 shown in FIG. 3 in accordance with an embodiment in which the weldable inserts may have resistive features on them to allow for resistive welding to be used to weld the inserts together.

FIG. 6 illustrates a perspective bottom view of the heat dissipation block 80B of the parallel optical transmitter 110 shown in FIG. 3 in accordance with an embodiment. In accordance with this embodiment, the weldable inserts 50 and/or 100 may have resistive features on them to allow for resistive welding to be used to weld the inserts 50 and 100 together. In FIG. 6 the inserts 100 that are contained in slots 90 formed in the heat dissipation blocks include one or more of such resistive features 140. When using this type of welding technique, an electrical current is passed through the inserts 100. The resistive features 140 locally increase the electrical resistance encountered by the electrical current, causing the resistive features to melt and fuse to the inserts 50 contained in the slots 40 of the mounting device 10. For ease of illustration and in the interest of brevity, only the inserts 100 of the OSA 60 are shown in FIG. 6 as containing the resistive features 130. The resistive features 130 could instead be contained in the inserts 50 of the mounting device 10, or could be contained in both the inserts 50 and the inserts 100.

Figure 7:
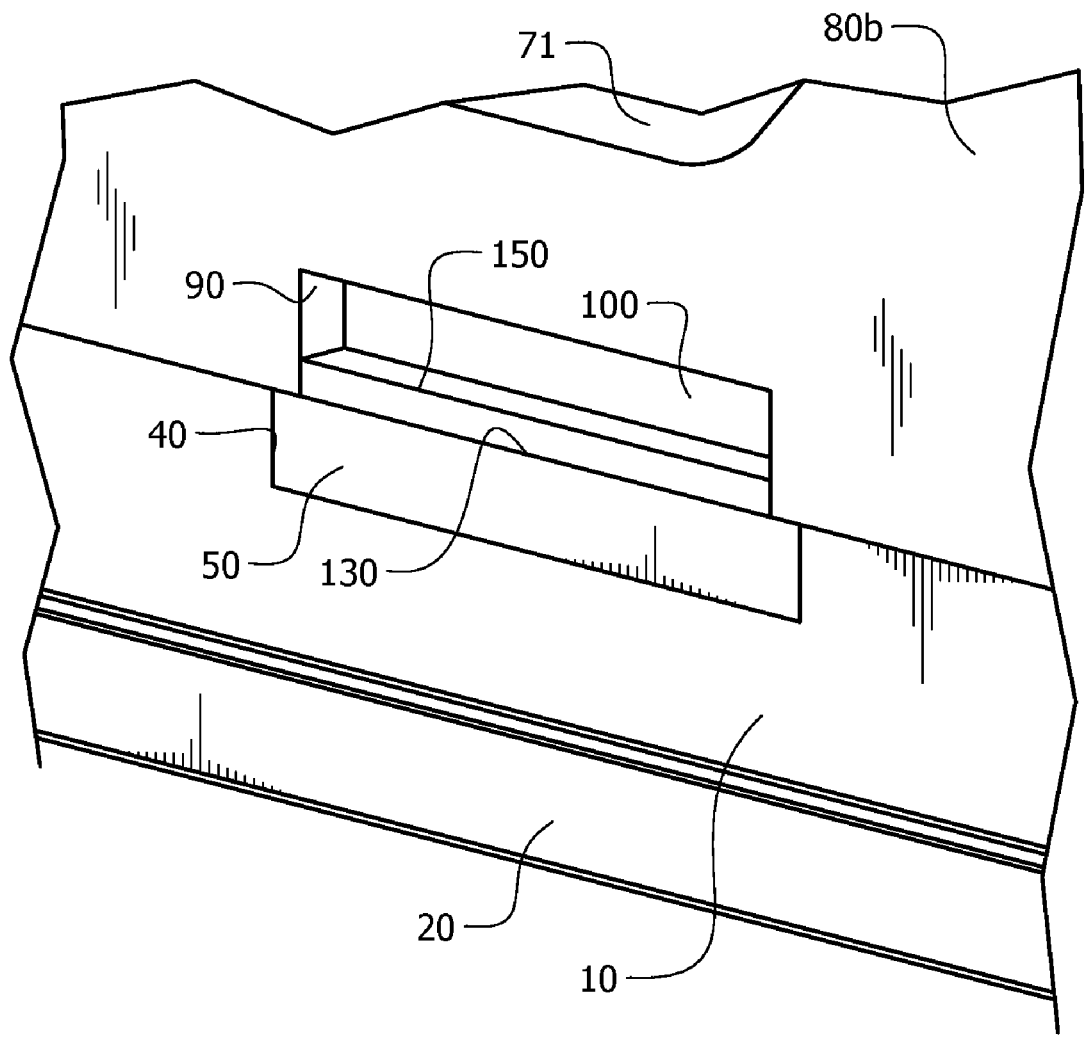
FIG. 7 illustrates an exploded view of a portion of the side of the parallel optical transmitter shown in FIG. 3, which demonstrates the manner in which a solder material placed on a step where the weldable inserts of the ESA and the OSA meet is used to weld the inserts together.

FIG. 7 illustrates an exploded view of a portion of the side of the parallel optical transmitter 110 shown in FIG. 3. In the exploded view, a portion of the substrate 20, the mounting device 10, and the side 71 of the lens holder 70 of the OSA 60 can be seen. Within the exploded view, the slots 40 and 90 and their respective inserts 50 and 100 can also be seen. In accordance with an embodiment, like the embodiment described above with reference to FIG. 5, there is a difference between the dimensions of the slots 40 and 90 and of the inserts 50 and 100, respectively, which results in the aforementioned steps 130 existing at the interfaces of the inserts 50 and 100. This step 130 provides space for a solder material 150 to be located. When an electric current is passed through the solder material 150, the solder material 150 melts. Once the solder material 150 re-solidifies, the re-solidified solder material 150 forms the welded joint that holds the ESA 1 and the OSA 60 together.

Figure 8:
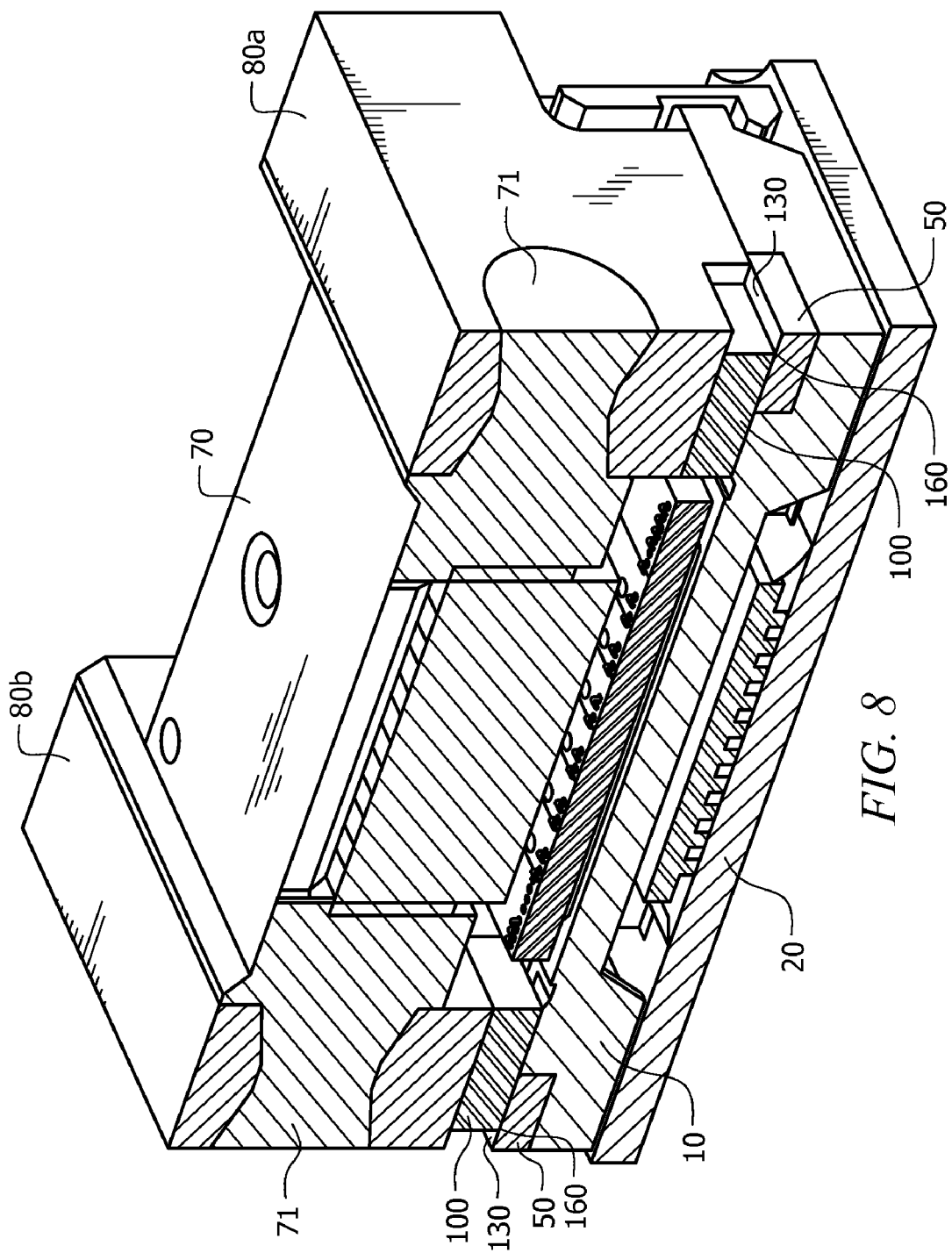
FIG. 8 illustrates a perspective view of a cross-section of the parallel optical transmitter shown in FIG. 3, which demonstrates the manner in which a laser welding technique may be used to weld the weldable inserts shown in FIG. 3 together.

FIG. 8 illustrates a perspective view of a cross-section of the parallel optical transmitter 110 shown in FIG. 3. In the view shown in FIG. 8, a portion of the substrate 20, the mounting device 10, the side portions 71 of the lens holder 70, and overlapping portions of the inserts 50 and 100 to form the step 130 can be seen. In accordance with this embodiment, a well known laser welding technique is used to locally heat areas 160 where the inserts 50 and 100 meet. When these areas 160 are heated, they heat up rapidly, and then cool. As the areas 160 cool, the inserts 50 and 100 become fused together to form the welded joint. When the laser welding technique is properly performed, the welded joint that is formed is extremely strong. In addition, because laser welding can be performed very quickly, using this technique to form the welded joint expedites the process of optically aligning the ESA 1 and the OSA 60 and forming the welded joint that holds them together. Areas in addition to the areas 160 may be heated with the laser, such as additional areas along the step 130 where the inserts 50 and 100 meet.

It should be noted that the invention is not limited to a parallel optical transmitter 110. Although the invention has been described with reference to the parallel optical transmitter 110, the parallel optical communications device may instead be a parallel optical receiver or a parallel optical transceiver. In the case of a parallel optical receiver, the laser diodes 5 would be replaced with photodiodes (not shown) and the laser diode driver ICs 3 and 4 would be replaced with a receiver IC (not shown), as will be understood by persons of ordinary skilled in the art. The OSA 60 may be configured the same for a parallel optical receiver. In the case of a parallel optical transceiver, half of the active optical devices may be laser diodes and the other half of the active optical devices may be photodiodes. The OSA 60 may be configured the same for a parallel optical transceiver. Thus, the term "a parallel optical communications device", as that term is used herein, is intended to denote a parallel optical transmitter, a parallel optical receiver, or a parallel optical transceiver.

It should be noted that the invention has been described with respect to illustrative embodiments for the purpose of describing the principles and concepts of the invention. The invention is not limited to these embodiments. For example, while the invention has been described with reference to using a particular balanced driver layout, the invention is not limited to this particular layout. Also, while the invention has been described with reference to a particular configuration for the slots 40 and 90 and for the respective weldable inserts 50 and 100, the invention is not limited to this particular configuration. The invention also is not limited to using any particular welding technique to create the welded joint, as will be understood by persons of ordinary skill in the art in view of the description being provided herein. As will be understood by those skilled in the art in view of the description being provided herein, many modifications may be made to the embodiments described herein while still providing a parallel optical communications device that achieves the goals of the invention, and all such modifications are within the scope of the invention.

What is claimed is:

1. A parallel optical communications device comprising:
a substrate;
an electrical subassembly (ESA) mounted on the substrate, the ESA including a metal mounting device having at least an upper surface and a lower surface, the upper surface of the metal mounting device having at least one integrated circuit (IC) and a plurality of active optical devices mounted thereon, said at least one IC being electrically coupled to the active optical devices, said at least one IC being electrically coupled to electrical conductors of the substrate, the metal mounting device having at least one slot formed in the upper surface of the metal mounting device and at least one metal weldable ESA insert fixedly secured to said at least one slot;
an optical subassembly (OSA) mechanically coupled to the ESA, the OSA including at least one metal heat dissipation block secured thereto, said at least one metal heat dissipation block comprising a metallic material having a high thermal conductivity, said at least one metal heat dissipation block having at least one slot formed therein in a lower surface of said at least one metal heat dissipation block and at least one metal weldable OSA insert fixedly secured to said at least one slot formed in the lower surface of said at least one metal heat dissipation block, the lower surface of said at least one metal heat dissipation block being in at least partial contact with the upper surface of the metal mounting device such that the metal weldable OSA and ESA inserts are at least partially in contact with one another; and
wherein said at least one metal weldable ESA insert and said at least one metal weldable OSA insert are welded together to form at least one welded joint between the OSA and the ESA where the metal weldable ESA and OSA inserts have been fused together, and wherein said at least one welded joint is structurally very strong to prevent relative movement from occurring between the OSA and the ESA.

2. The parallel optical communications device of claim 1, wherein the mounting device has at least two slots formed therein at opposite ends of the mounting device, each of the slots containing the metal weldable ESA insert, and wherein the OSA includes at least two metal heat dissipation blocks secured to opposite sides of the OSA, each of the metal heat dissipation blocks having a slot formed in the lower surface thereof with each slot formed in the lower surfaces of the heat dissipation blocks containing the metal weldable OSA insert, and wherein when the OSA and the ESA are mechanically coupled together, the metal weldable OSA inserts are in contact with respective ones of the metal weldable ESA inserts, and wherein the metal weldable ESA inserts and the respective metal weldable OSA inserts are welded together to form two welded joint between the OSA and the ESA where the metal weldable ESA inserts and the respective metal weldable OSA inserts have been fused together.

3. The parallel optical communications device of claim 1, wherein said at least one metal weldable OSA insert has a lower surface that is generally co-planar with the lower surface of said at least one metal heat dissipation block, and wherein the lower surface of said at least one metal weldable OSA insert has a surface area that is relatively small compared to a surface area of the lower surface of said at least one metal heat dissipation block.

4. The parallel optical communications device of claim 3, wherein the surface area of the lower surface of said at least one metal weldable OSA insert is no greater than about 50% of the surface area of the lower surface of said at least one metal heat dissipation block.

5. The parallel optical communications device of claim 4, wherein the surface area of the lower surface of said at least one metal weldable OSA insert is less than or equal to about 35% of the surface area of the lower surface of said at least one metal heat dissipation block.

6. The parallel optical communications device of claim 1, wherein said at least one slot formed in the lower surface of said at least one metal heat dissipation block is smaller in a width dimension than a width dimension of said at least one slot formed in the upper surface of the metal mounting device, and wherein said at least one metal weldable OSA insert is smaller in a width dimension than a width dimension of said at least one metal weldable ESA insert such that a step exists where the metal weldable OSA insert and the metal weldable ESA insert meet.

7. The parallel optical communications device of claim 1, wherein said at least one slot formed in the lower surface of said at least one metal heat dissipation block is greater in a width dimension than a width dimension of said at least one slot formed in the upper surface of the metal mounting device, and wherein said at least one metal weldable OSA insert is greater in at least a width dimension than a width dimension of said at least one metal weldable ESA insert such that a step exists where the metal weldable OSA insert and the metal weldable ESA insert meet.

8. A parallel optical communications device comprising:
a substrate having one or more electrical conductors passing through the substrate;
an electrical subassembly (ESA) mounted on the substrate, the ESA including a metal mounting device having at least an upper surface and a lower surface, the upper surface of the metal mounting device having at least one integrated circuit (IC) and a plurality of active optical devices mounted thereon, said at least one IC being electrically coupled to the active optical devices, said at least one IC being electrically coupled to one or more of the electrical conductors of the substrate, the metal mounting device having at least two slots formed in the upper surface of the metal mounting device at opposite ends thereof, each of the slots containing a metal weldable ESA insert;
an optical subassembly (OSA) mechanically coupled to the ESA, the OSA including at least two metal heat dissipation blocks secured thereto on opposite ends thereof, said at least two metal heat dissipation blocks comprising a metallic material of high thermal conductivity, each metal heat dissipation block having at least one slot formed in a lower surface thereof and a metal weldable OSA insert contained in each slot formed in the lower surfaces of the metal heat dissipation blocks, the lower surfaces of the metal heat dissipation blocks being in at least partial contact with the upper surface of the metal mounting device such that the metal weldable OSA inserts are at least partially in contact with respective ones of the metal weldable ESA inserts; and
wherein respective ones of the metal weldable ESA inserts are welded to respective ones of the metal weldable OSA inserts to form at least two welded joints between the OSA and the ESA where the metal weldable ESA inserts and the respective metal weldable OSA inserts have been fused together, and wherein said at least two welded joints are structurally very strong to prevent relative movement from occurring between the OSA and the ESA.

9. The parallel optical communications device of claim 8, wherein the metal weldable OSA inserts have respective lower surfaces that are generally co-planar with the respective lower surfaces of the respective metal heat dissipation blocks, and wherein the respective lower surfaces of the respective metal weldable OSA inserts have respective surfaces area that are relatively small compared to the respective surface areas of the respective lower surfaces of the respective metal heat dissipation blocks.

10. The parallel optical communications device of claim 9, wherein the surface areas of the lower surfaces of the metal weldable OSA inserts are no greater than 50% of the respective surface areas of the respective lower surfaces of the respective metal heat dissipation blocks.

11. The parallel optical communications device of claim 10, wherein the surface areas of the lower surfaces of the respective metal weldable OSA inserts are less than or equal to about 35% of the respective surface areas of the respective lower surfaces of the respective metal heat dissipation blocks.

12. The parallel optical communications device of claim 9, wherein the respective slots formed in the respective lower surfaces of the respective metal heat dissipation blocks are smaller in a width dimension than a width dimension of the respective slots formed in the upper surface of the metal mounting device, and wherein the respective metal weldable OSA inserts are smaller in a width dimension than a width dimension of the respective metal weldable ESA inserts such that respective steps exists where the respective metal weldable OSA inserts and the respective metal weldable ESA inserts meet.

13. The parallel optical communications device of claim 9, wherein the respective slots formed in the respective lower surfaces of the respective metal heat dissipation blocks are greater in a width dimension than a width dimension of the respective slots formed in the upper surface of the metal mounting device, and wherein the respective metal weldable OSA inserts are greater in a width dimension than a width dimension of the respective metal weldable ESA inserts such that respective steps exists where the respective metal weldable OSA inserts and the respective metal weldable ESA inserts meet.

14. A method for securing an electrical subassembly (ESA) of a parallel optical communications device to an optical subassembly (OSA) of the parallel optical communications device, the method comprising:
mounting a metal mounting device of an ESA on a substrate, the metal mounting device having at least an upper surface and a lower surface, the upper surface of the metal mounting device having at least one integrated circuit (IC) of the ESA and a plurality of active optical devices of the ESA mounted thereon, said at least one IC being electrically coupled to the active optical devices, said at least one IC being electrically coupled to electrical conductors of the substrate, the metal mounting device having at least one slot formed in the upper surface of the metal mounting device and at least one metal weldable ESA insert contained in said at least one slot;
mechanically coupling an OSA to the ESA, the OSA including at least one metal heat dissipation block secured thereto, said at least one metal heat dissipation block comprising a metallic material having a high thermal conductivity, said at least one metal heat dissipation block having at least one slot formed therein in a lower surface of said at least one metal heat dissipation block and at least one metal weldable OSA insert contained in said at least one slot formed in the lower surface of said at least one metal heat dissipation block, the lower surface of said at least one metal heat dissipation block being in at least partial contact with the upper surface of the metal mounting device such that the metal weldable OSA and ESA inserts are at least partially in contact with one another; and
optically aligning the OSA to the ESA; and
welding said at least one metal weldable ESA insert and said at least one metal weldable OSA insert together to form at least one welded joint between the OSA and the ESA where the metal weldable ESA insert and the metal weldable OSA insert have been fused together, and wherein said at least one welded joint is structurally very strong to prevent relative movement from occurring between the OSA and the ESA.

15. The method of claim 14, wherein said at least one metal weldable OSA insert has a lower surface that is generally co-planar with the lower surface of said at least one metal heat dissipation block, and wherein the lower surface of said at least one metal weldable OSA insert has a surface area that is relatively small compared to a surface area of the lower surface of said at least one metal heat dissipation block.

16. The method of claim 15, wherein the surface area of the lower surface of said at least one metal weldable OSA insert is no greater than 50% of the surface area of the lower surface of said at least one metal heat dissipation block.

17. The method of claim 16, wherein the surface area of the lower surface of said at least one metal weldable OSA insert is less than or equal to about 35% of the surface area of the lower surface of said at least one metal heat dissipation block.

18. The method of claim 14, wherein said at least one slot formed in the lower surface of said at least one metal heat dissipation block is smaller in a width dimension than a width dimension of said at least one slot formed in the upper surface of the metal mounting device, and wherein said at least one metal weldable OSA insert is smaller in a width dimension than a width dimension of said at least one metal weldable ESA insert such that a step exists where the metal weldable OSA insert and the metal weldable ESA insert meet.

19. The method of claim 14, wherein said at least one slot formed in the lower surface of said at least one metal heat dissipation block is greater in a width dimension than a width dimension of said at least one slot formed in the upper surface of the metal mounting device, and wherein said at least one metal weldable OSA insert is greater in at least a width dimension than a width dimension of said at least one metal weldable ESA insert such that a step exists where the metal weldable OSA insert and the metal weldable ESA insert meet.

20. A method for securing an electrical subassembly (ESA) of a parallel optical communications device to an optical subassembly (OSA) of the parallel optical communications device, the method comprising:
mounting a metal mounting device of an ESA on a substrate, the substrate having one or more electrical conductors passing through the substrate, the metal mounting device having at least an upper surface and a lower surface, the upper surface of the metal mounting device having at least one integrated circuit (IC) of the ESA and a plurality of active optical devices of the ESA mounted thereon, said at least one IC being electrically coupled to the active optical devices, said at least one IC being electrically coupled to one or more of the electrical conductors of the substrate, the metal mounting device having at least two slots formed in the upper surface thereof at opposite ends thereof, each of the slots containing a metal weldable ESA insert;

mechanically coupling an OSA to the ESA, the OSA including at least two metal heat dissipation blocks secured thereto on opposite ends thereof, said at least two metal heat dissipation blocks comprising a material of high thermal conductivity, each metal heat dissipation block having at least one slot formed in a lower surface thereof and a metal weldable OSA insert contained in each slot formed in the lower surfaces of the metal heat dissipation blocks, the lower surfaces of the metal heat dissipation blocks being in at least partial contact with the upper surface of the metal mounting device such that the metal weldable OSA inserts are at least partially in contact with respective ones of the metal weldable ESA inserts;

optically aligning the OSA with the ESA; and welding respective ones of the metal weldable ESA inserts to respective ones of the metal weldable OSA inserts to form at least two welded joints between the OSA and the ESA where the metal weldable ESA inserts and the respective metal weldable OSA inserts have been fused together, and wherein said at least two welded joints are structurally very strong to prevent relative movement from occurring between the OSA and the ESA.

* * * * *